United States Patent [19]

Kawazu et al.

[11] Patent Number: 5,308,876
[45] Date of Patent: May 3, 1994

[54] MATERIALS FOR REMOVING SUSPENDED IMPURITIES AND USE THEREOF

[75] Inventors: Hideo Kawazu; Masahiro Hagiwara; Takeshi Izumi, all of Kanagawa, Japan

[73] Assignee: Ebara Corporation, Tokyo, Japan

[21] Appl. No.: 888,431

[22] Filed: May 28, 1992

Related U.S. Application Data

[63] Continuation-in-part of Ser. No. 600,809, Oct. 22, 1990, abandoned.

[30] Foreign Application Priority Data

Oct. 20, 1989 [JP] Japan .................................. 1-271466

[51] Int. Cl.$^5$ .............................................. C08J 5/20
[52] U.S. Cl. .................................... 521/25; 210/661; 210/679; 428/116; 428/357; 428/402; 428/402.24; 428/407; 521/29; 521/38; 525/902
[58] Field of Search ...................... 521/25, 29; 525/902

[56] References Cited

U.S. PATENT DOCUMENTS

| | | | |
|---|---|---|---|
| 3,250,703 | 5/1966 | Levendusky | 521/24 |
| 3,389,080 | 6/1968 | Arden | 210/32 |
| 3,627,708 | 12/1971 | Morse | 521/63 |
| 3,716,482 | 2/1973 | Corte | 210/24 |
| 4,419,245 | 12/1983 | Barrett | 210/681 |
| 4,564,644 | 1/1986 | Harris | 521/28 |

FOREIGN PATENT DOCUMENTS

| | | |
|---|---|---|
| 0149792 | 10/1973 | European Pat. Off. . |
| 098130 | 1/1984 | European Pat. Off. . |
| 0101943 | 3/1984 | European Pat. Off. . |
| 2314835 | 10/1973 | Fed. Rep. of Germany . |
| 2529145 | 1/1977 | Fed. Rep. of Germany . |
| 902347 | 9/1975 | United Kingdom . |
| 1407099 | 9/1975 | United Kingdom . |

OTHER PUBLICATIONS

Suzuki et al, Japan Atomic Energy Soc., (1987 Fall Meeting) K40 and K41 (translation supplied by applicant).
Hirahara, Y., JAIF International Conference on Water Chemistry in Nuclear Power Plants; Proceedings vol. 2, 694–698 (1988).
Journal of Chemical Society 1965, pp. 304–310; J. R. Millar "Solvent-Modified Polymer Networks. Part IV." *p. 308–p. 309*.
Journal of Chemical Society 1963, pp. 218–225; J. R. Millar "Solvent-Modified Polymer Networks. Part I." *p. 224–p. 225*.
Journal of Polymer Science, part C, No. 16, 1967, pp. 1457–1469; K. A. Kun et al.: "The pore structure of macroreticular ion exchange resins" *pp. 1460–1468*.
Chemical Abstracts, vol. 101, No. 14, Oct. 1984, abstract No. 116554s, Columbus, Ohio, US; & JP-A-59 52 576 (Hitachi) Mar. 27, 1984 *Abstract*.
Chemical Abstracts, vol. 79, No. 16, Oct. 22, 1973, abstract No. 94101q, Columbus, Ohio, US; & JP-A-73 34 778 (Kurita Ind.) May 22, 1973 *Abstract*.
Japan Atomic Energy Soc., [The meeting of 1988], J27 and J28, accompanied by an English translation of the gist thereof.
The Fourth Japan Ion Exchange, Meeting for presenting report, Collection of Lecture Abstract, Sep. 1988, (List continued on next page.)

*Primary Examiner*—Fred Zitomer
*Attorney, Agent, or Firm*—Wenderoth, Lind & Ponack

[57] ABSTRACT

The improved organic polymeric adsorbent is used to adsorb and remove suspended impurities present in trace amounts in the water being treated in an apparatus for producing ultrapure water for use in the semiconductor industry or in a condensate purifier in steam power generating facilities and it is composed of a particulate or powdered cation exchange resin and/or anion exchange resin. The improvement is that this adsorbent has such a surface layer structure and morphology that granules are seen to bind with one another when examined under a scanning electron microscope in a field of view ranging from a magnification of 50 to 200,000. The adsorbent may be used as the constituent of a packing layer and/or a filter layer to make a material for removing suspended impurities.

4 Claims, 9 Drawing Sheets

OTHER PUBLICATIONS 34 and 35, accompanied by an English translation of the gist thereof.

Japan Atomic Energy Soc., [The meeting of 1989], J14 and J15, accompanied by an English translation of the gist thereof.

Japan Ion Exchange Soc., the Fifth Meeting, Collection of Lecture Abstract 9, accompanied by an English translation of the gist thereof.

Ebara Engineering Review, Oct. 1989, pp. 49–53, accompanied by an English translation of the gist thereof.

Japanese Patent Public Disclosure (Laid–Open) No. 18705/84 accompanied by corresponding U.S. Pat. No. 4,419,245 specification.

Japanese Patent Public Disclosure (Laid–Open) No. 98117/84 accompanied by corresponding U.S. Pat. No. 4,564,644 specification.

Japanese Patent Public Disclosure (Laid–Open) No. 16902/86 accompanied by corresponding by European Patent Publication No. 0168622 specification.

Japanese Patent Public Disclosure (Laid–Open) No. 252202/86 accompanied by English Abstract thereof.

Japanese Patent Public Disclosure (Laid–Open) No. 501096/86 accompanied by corresponding International Publication No. WO 85/04885.

Japanese Patent Public Disclosure (Laid–Open), No. 174998/89 accompanied by English Abstract thereof.

Japanese Patent Public Disclosure (Laid–Open) No. 176491/89 accompanied by English Abstract thereof.

5 μm

5 μm

10 μm

5 μm

MATERIALS FOR REMOVING SUSPENDED IMPURITIES AND USE THEREOF

This application is a continuation-in-part of now abandoned application Ser. No. 07/600,809, filed Oct. 22, 1990 now abandoned.

BACKGROUND OF THE INVENTION

1. Field of the Invention

This invention relates to materials for removing suspended impurities. More particularly, this invention relates to an organic polymeric adsorbent of an ion exchange resin or an adsorbing material having a unique surface and surface layer structure and morphology and by which suspended impurities chiefly comprised of metallic oxides present in trace amounts in water which, for example, is to be treated to make ultrapure water can be removed with a remarkably increased efficiency. Generally speaking, the metallic oxides in condensate water are mainly composed by iron oxides which are called as "crud" or "crud iron". This invention also relates to a use of that polymeric adsorbent or adsorbing material, and to a method of removing suspended impurities employing that polymeric adsorbent or adsorbing material.

2. Description of the Prior Art

In order to enable the interior of boilers used in steam power generating facilities to be always kept clean, the condensate water returning from the condensing turbine to the boiler is highly purified 7ith a condensate demineralizer before it is supplied as cooling water into the boiler.

The condensate demineralizer is of a "mixed bed" type in which a cation exchange resin and an anion exchange resin are packed in admixture. Impurities in condensate water, i.e., ionic components and suspended solid components (chiefly comprised of fine particulate metal oxides), are separated by ion exchange and by adsorption and filtration so as to purify the condensate water. In this regard, ion exchange resins may be classified as organic polymeric adsorbents. Mixed beds of cation and anion exchange resins have conventionally been formed by using resins in gel form and/or porous and/or macroreticular resins.

In the conventional method of using particulate ion exchange resins, impurities such as ionic components and metal oxides that are adsorbed or trapped by ion exchange resins are removed by periodical regenerations with chemicals or through mechanical back washing so as to maintain in a clean condition the condensate demineralizer.

While the efficiency of removing impurities from condensate water is important as regards both ionic components and metal oxides, enhanced separation of metal oxides such as crud iron has recently become particularly important for the operation of boiling water nuclear power generating facilities in steam power generating facilities. Separation is carried out for the purpose of reducing the dose of radioactivity to which operators are exposed during periodical inspections of the plant at the outage by reducing the amount of metal oxides carried over from the cooling water into the nuclear reactor. It has, however, been found that this need cannot be met by the prior art method of using conventional particulate ion exchange resins since it is not highly effective for removing metal oxides.

SUMMARY OF THE INVENTION

Under these circumstances, the present inventors conducted intensive studies in order to develop an improved adsorbent capable of removing metal oxides from condensate water with a high degree of efficiency.

An object, therefore, of the present invention is to provide an adsorbent by which suspended impurities can be efficiently removed from condensate water being treated with a condensate demineralizer.

Another object of the present invention is to provide a material by which suspended impurities can be efficiently removed from condensate water being treated with a condensate demineralizer.

A further object of the present invention is to provide a method of removing suspended impurities from condensate water which employs said adsorbent or removing material.

To achieve these objects and in accordance with the purpose of the invention, the organic polymer adsorbent of this invention is used to adsorb and remove suspended impurities (chiefly made of colloidal substances such as metal /xides) that are present in trace amounts in the water being treated in an apparatus for producing ultrapure water for use in the semiconductor industry or in a condensate purifier in stream power generating facilities, and is composed of a particulate or powered cation exchange resin and/or anion exchange resin, and said adsorbent has such a surface layer structure and morphology that granules are seen to bind with one another when examined under a scanning electron microscope in a field of view ranging from a magnification of 50 to 200,000.

In an embodiment of the present invention, said adsorbent comprises particles in a true spherical form in which unit granules having a size of 0.1-1.0 μm are bound together to have a diameter of 0.2-1.2 mm. The size of the true spherical particles in this adsorbent need not be continuous to provide a Gaussian distribution and, instead, they may have a single or uniform particle size.

In another embodiment of the present invention, the adsorbent composed of truly spherical particles has a honeycomb and/or scaly surface structure with grooves in the surface.

In a preferred embodiment, unit honeycombs and/or scales each has a unit surface area of 1-50 μm$^2$ and agglomerate together to form an irregular surface structure, with the surface being such that the individual unit honeycombs and/or scales are adjacent to one another via grooves having a width of 0.1-5 μm and a depth of 0.1-5 μm. These grooves may have an overall length of 100-1,000 mm per unit surface area in mm$^2$.

In a further embodiment of the present invention, the adsorbent composed of true spherical particles has an effective specific surface area of 0.02-1.00 m$^2$ per gram of dry adsorbent, with the effective specific surface area being measured on the basis of the amount of adsorption of krypton and/or a gas equivalent to krypton. This procedure is well known as "BET" method. The adsorbent of the present invention may have a dual structure with a skin layer being present to a depth of at least 0.1-10 μm from the surface. FIGS. 9(a) and (b) show that in the dual structure of the particulate polymeric adsorbent differs in the vicinities of the surface and center as shown in the sectional view of the adsorbent; the surface having a relatively coarse structure and the center having a relatively dense structure. The adsorbent functions to remove metal oxides from condensate water as follows: Metal oxides having been adsorbed into the surface of the adsorbent, migrate into the center, and are occluded; consequently, metal oxides are easily taken into the adsorbent.

The adsorbent in the shape of true spherical particles may be finely pulverized to obtain an adsorbent in powder form of about 60 to about 400 mesh.

Either one of the adsorbents described above may be used as the constituent of a packing layer and/or a filter layer to make a material that is capable of removing suspended impurities from ultrapure water or condensate water with enhanced efficiency.

In accordance with yet another aspect of the present invention, the above-described material may be used to remove suspended impurities from various kinds of water under treatment such as ultrapure water used in the semiconductor industry or condensate water produced in steam power generating facilities.

The adsorbent of the present invention has such a surface and/or surface structure and/or morphology that it is capable of selective adsorption and removal of metal oxides. Hence, compared to ion exchanging adsorbents used in conventional "mixed bed" type demineralizers, the adsorbent of the present invention has a higher affinity for metal oxides and is capable of separating and removing them with a higher degree of efficiency. Accordingly, when used in demineralization, the adsorbent of the present invention has the advantage of producing higher purity water containing smaller amounts of metal oxides.

Other objects and advantages of the present invention may become apparent to those skilled in the art from the following description.

BRIEF DESCRIPTION OF THE DRAWINGS

FIG. 9($a$) is a scanning electron micrograph showing the surface state and vicinities of a sectional view of a polymeric adsorbent to be used in the present invention.

FIG. 9($b$) is a scanning electron micrograph showing the state of the vicinities of the center of a sectional view of polymeric adsorbent to be used in the present invention.

DETAILED DESCRIPTION OF THE INVENTION

Figure 1B:
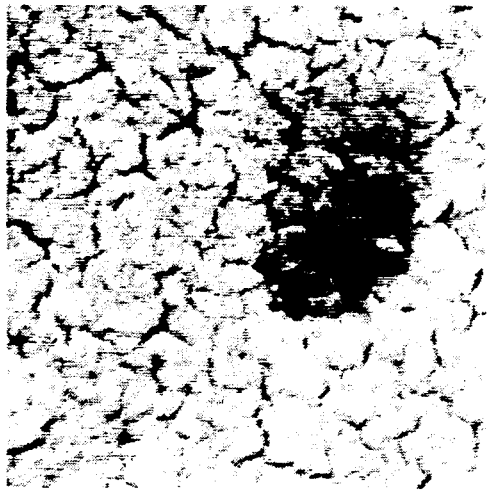
FIG. 1 is a scanning electron micrograph showing the surface state of various polymeric adsorbents which are all cation exchange resins.
Figure 1A:
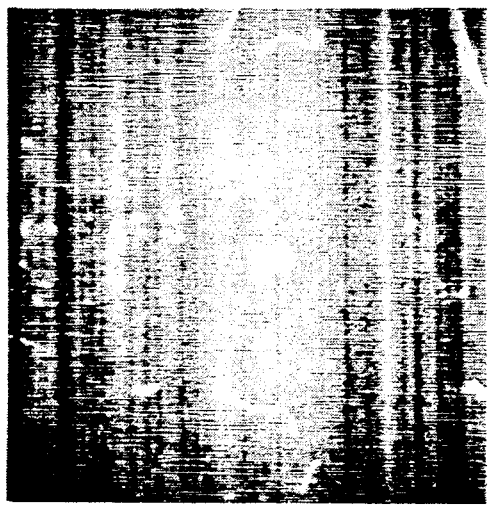
Figure 1D:
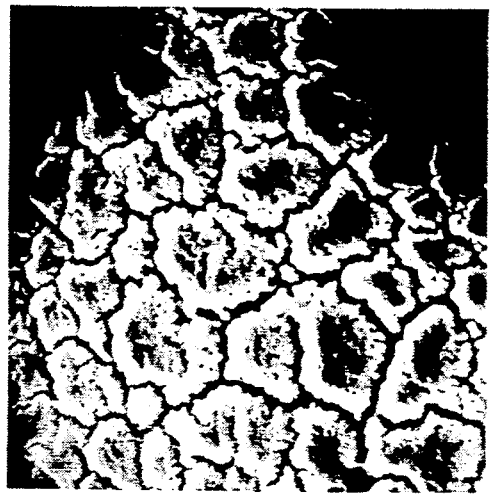
Figure 1C:

Basic processes for producing an ion-exchange resin that serves as the polymeric adsorbent of the present invention are already known and described in several references including Japanese Patent Public Disclosure No. 18705/1984 and also Japanese Patent Public Disclosure No. 98117/1984. Among the various ion-exchange resins that are produced by these methods, those which possess the physical and/or chemical properties described above are particularly effective in removing suspended impurities, inter alia, fine particulate metal oxides such as crud iron, present in trace amounts in ultrapure water and condensate water.

The present inventors selected 14 cation-exchange resins and 6 anion-exchange resins that were particularly effective in removing fine particulate metal oxides from condensate water and analyzed the chemical and physical properties of those resins. Typical results of the analyses are shown in Table 1; five of the factors listed in Table 1, i.e., water retention capacity (water content), wet bulk density, specific gravity, neutral salt decomposition capacity and crushing strength, are routine parameters which are measured as general characteristics of ion-exchange resins; for example, water retention capacity is measured by the Method B of ASTM D 2187-82; wet bulk density is measured as back washed and settled density by the Method C of ASTM D 2187-82; specific gravity in wet state is measured by the method described in "Diaion Manual", vol. 1, p. 141, 2nd edition, Jul. 1, 1990 by Mitsubishi Kasei Corporation (Japanese); salt-splitting capacity is measured by the Method E for cation exchange resins and the Method H for anion exchange resins described in ASTM D 2187-82; and crush strength is measured as friability by D/wex Resin Method No. 25 (Jan. 3, 1973); the "pH of resin surface" was measured with a compact pH meter Model C-1 of Advantec Horiba Co., Ltd.; The "specific surface area" was measured with QUANATSORB of Quantachrome, Inc. by the BET method using krypton as an adsorbate gas; and zeta potential was measured with a particle micro-electrophoresis apparatus Model Mark II of Rank Brothers Co., Ltd. by electrophoresis as applied to the fine particles of a sample resin that were dispersed and suspended in pure water.

FIG. 1 is a scanning electron micrograph showing the surface structure of various polymeric adsorbents formed of cation exchange resins. Photo (A) shows the surface state of a conventional gel type adsorbent (virgin: definitely DIAION "SK1B"). Obviously, this adsorbent has a very smooth surface in the virgin state. Photo (B) shows the surface state of this adsorbent (definitely aged DIAION SK1B) that has been disposed of after prolonged use in make-up demineralizer. According to the various studies previously conducted by the present inventors, it has been found that the efficiency with which metal oxides suspended as colloidal substances in trace amounts in pure water can be removed with polymeric adsorbents is low as long as it is fresh and that a gradual increase occurs as it is used over time. One of the reasons for this phenomenon is that as the polymeric adsorbent especially cation exchange resin is used over time, it increases its ability to adsorb colloidal substances in such a way that they can be readily incorporated into the adsorbent through its surface. This phenomenon is generally explained as a change in the matrices of the adsorbent caused by the oxidative degradation to irreversible swelling of the polymeric adsorbent. As a result of this phenomenon, the smooth surface shown in photo (A) changes to a honeycomb and/or scaly structure with grooves as shown in photo (B). Photo (C) shows the surface state of a conventional macroporous cationic adsorbent (virgin: definitely DIAION PK216). Obviously, this adsorbent has a porous surface. This adsorbent at first efficiently removes colloidal substances but such efficiency soon decreases because pores in the adsorbent are clogged by colloidal substances in a fairly short time. Photo (D) shows the surface state of the novel polymeric adsorbent of the present invention (virgin). Obviously, this adsorbent has a surface that is quite different from the conventional gel type and macroporous adsorbents in the virgin state and which is rather similar to the state shown in photo (B). It can therefore be seen that the polymeric adsorbent of the present invention will exhibit a high degree of efficiency in adsorbing and removing colloidal substances from the outset of its use.

Figure 2:
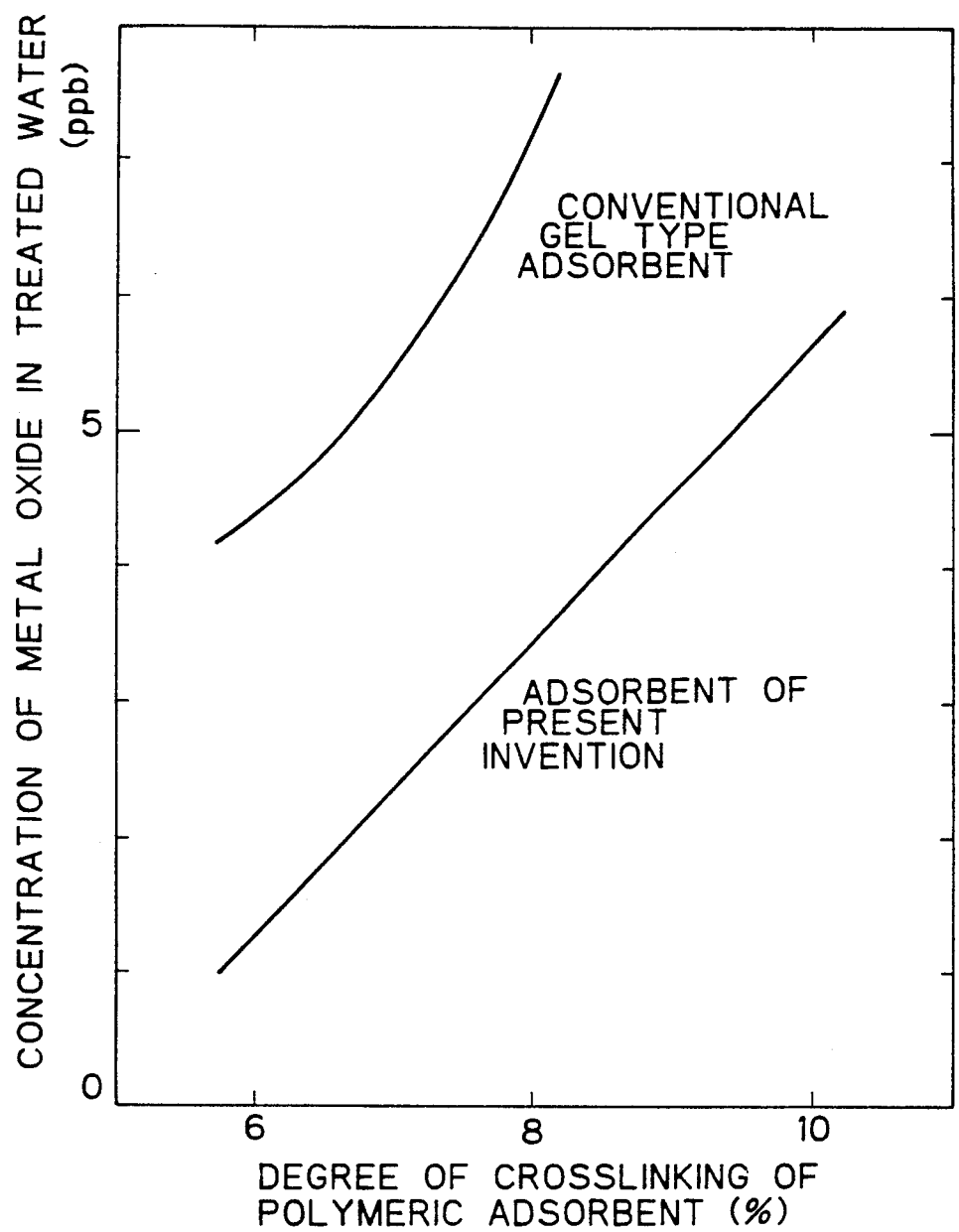
FIG. 2 is a graph showing the relationship between the degree of crosslinking of two polymeric adsorbents (cation exchange resins) and the concentration of metal oxides (ppb as Fe) in the water treated with those polymeric adsorbents.

FIG. 2 shows typical examples of the results of investigating the efficiency of removing metal oxides from water with various polymeric adsorbents vs. the degree of crosslinking of those adsorbents. In the graph shown in FIG. 2, the horizontal axis plots the degree of crosslinking of the adsorbents and the vertical axis plots the concentration of metal oxides (i.e., iron oxides) that remained unremoved in the treated water. In this study, inlet average concentration of crud iron was about 17.5 ppb as Fe. According to the previous studies conducted by the present inventors, the ability of polymeric adsorbents to remove metal oxides from pure water depends on the degree of crosslinking of those adsorbents and their ability increases as the degree of crosslinking decreases. The present inventors further found in the course of the studies conducted that the accomplish the present invention even polymeric adsorbents having comparable degrees of crosslinking had substantial differences in their ability to remove metal oxides depending upon their surface state and/or morphology such as the one of the surface layer. FIG. 2 shows that the polymeric adsorbent of the present invention has a markedly superior ability to remove metal oxides over the conventional gel type adsorbent.

Figure 3:
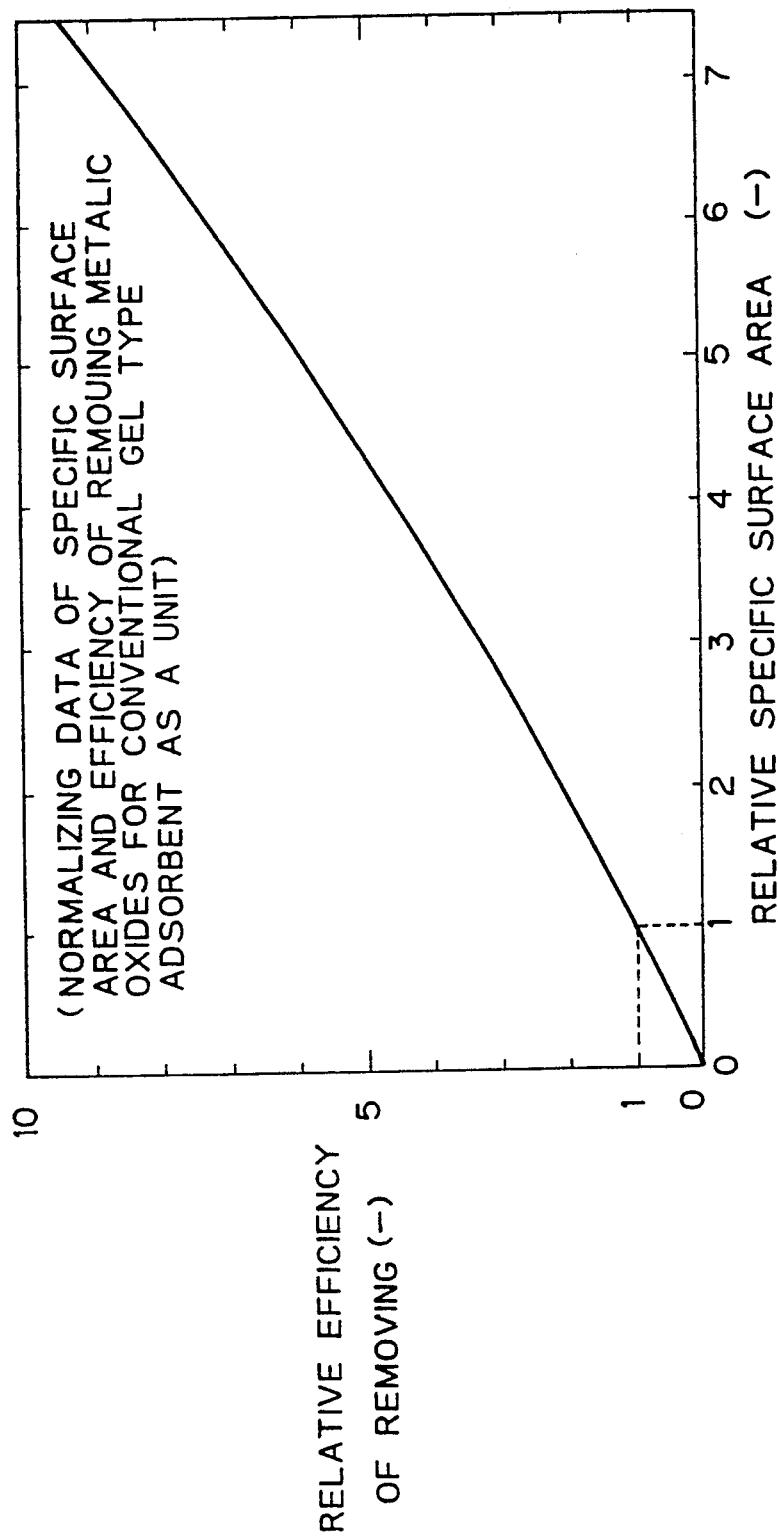
FIG. 3 is a graph showing the relationship between the relative specific surface area of a polymeric adsorbent (cation exchange resin) and the relative efficiency of removing metal oxides with said polymeric adsorbent.

FIG. 3 shows the results of investigating the relationship between the efficiency of removal of metal oxides with the polymeric adsorbent of the present invention and its effective specific surface area measured on the basis of the amount of krypton adsorption (this technique commonly referred to as the "BET method" is often used as a means of quantitatively evaluating the surface state of polymeric adsorbents). The results include the data shown in FIG. 2 and are expressed in terms of relative values by normalizing the data for the conventional gel type adsorbent as unity. Like FIG. 2, FIG. 3 also shows that the polymetric adsorbent of the present invention is superior to the conventional gel type adsorbent in its ability to remove metal oxides.

Uniform size seed particles, 0.3% crosslinked styrene/divinylbenzene copolymer seeds having a particle size of 150-300 μm are prepared by screening the seed particles or by preparing the seed particles using a process which produces polymer particles of a uniform size, such as those taught in published European Patent Application Nos. 0005619 and 0051210.

Into a 3-liter reactor equipped with an agitator are loaded 35 wt parts of the copolymer seed and sufficient water to suspend the seed particles. Further added, with agitation, is an initial monomer charge comprising 1.9 parts divinylbenzene (DVB), 63 parts styrene, 0.036 part t-butylperoctoate (TBPO) (based on the total weight of all the monomers employed), 0.025 part t-butylperbenzoate (TBPB) (based on the total weight of all the monomers employed), 0.15 parts carboxymethyl methylcellulose (CMMC) and 0.15-0.3 part sodium dichromate. Water is then added in an amount such that the weight phase ratio is 1.0 after the addition of the monomer feed. The reaction mixture is then heated to 70°-80° C. for 3 hours, at which time a monomer fee of 98.5% of styrene and 1.5% of DVB is begun. The monomer feed is fed at a constant rate into the reactor over a 6-10 hours period until said monomer feed comprises 71.4 wt % of the combined weight of the initial charge and the monomer feed. The reaction mixture is heated at 90°-100° C. for 2-3 hours.

A miniature skeleton of the resulting adsorbent is formed as a result of the steps of the latter stage of the above. The surface state, the surface area and the inner structure of the adsorbent are all subject to fine changes depending on the ratio of styrene to DVB, the time for pouring monomers and the heating conditions employed.

A 100 g portion of the copolymer beads thus obtained are chloromethylated by reacting the beads with an excess of chloromethylmethyl ether in the presence of ferritic chloride. The chloromethylated beads are then reacted with trimethylamine to form a strong base anion exchange resin bearing a plurality of quaternary ammonium ions.

Further, a 100 g portion of the above copolymer beads obtained are converted to strong acid cation exchange resins by sulfonating the beads using a 98-100 wt % sulfuric acid.

The strong base anion exchange resin and the strong acid cati/n exchange resins thus obtained are screened to collect the effective products which satisfy the essential requirements such as the view of their surface layer structure under a scanning electron microscope, an effective specific surface are being measured on the basis of the amount of adsorption of kyrpton and their crosslinking degree as defined in the claims.

EXAMPLE

The following example is provided for the purpose of further illustrating the present invention but is in no way to be taken as limiting.

EXAMPLE 1

In order to verify the effectiveness of the present invention, a "mixed bed" type column test was conducted as described below.

Mixed Bed Column Test (1) Test Conditions

Figure 4:
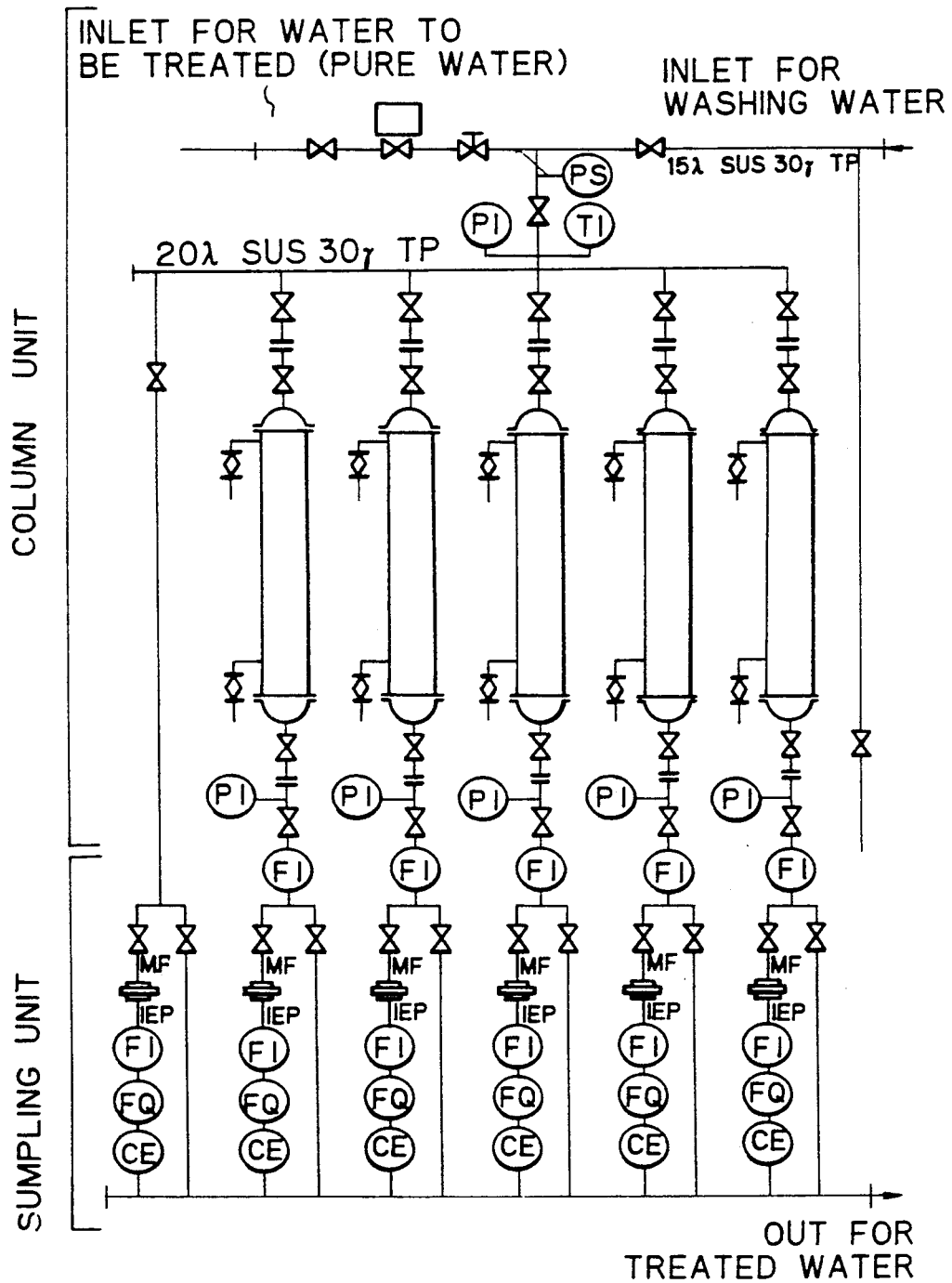
FIG. 4 is a flow diagram of the apparatus used in a "mixed bed" column test that was conducted to demonstrate the effectiveness of the present invention.

Using a testing system having the construction shown in FIG. 4, a "mixed bed" column test was conducted under the following conditions.
(i) Specifications of polymeric adsorbents (i.e. ion exchange resins)

The combination of conventional, strong acid, gel type cation exchange resin (H form) having a crosslinking degree (XL %) of 6% (DIAION SK106) or 8% (DIAION SK1B) with conventional, strong base anion exchange resin (OH type) (DIAION SA10B); the combination of conventional, strong acid, gel type cation exchange resin (XL=8%) (DIAION SK1B) and conventional, strong base, gel type anion exchange resin (DIAION SA10B) (the ion exchange resins were such that they were discarded after prolonged use in a make-up demineralizer and the degree of crosslinking of the cati/n exchange resin at the time of disposal was estimated as XL=7% on the basis of the results of water retention capacity measurement); the combination of a conventional, strong acid, macroporous cation exchange resin (XL=8%) (DIAION PK216) with a conventional, strong base, macroporous anion exchange resin (DIAION PA316); and the combination of three novel types of adsorbent of the present invention, i.e., a strong acid cation exchange resin (XL=6, 8 or 10%) and a strong base anion exchange resin; these ion exchange resins were used in admixtures to form "mixed beds";

(ii) Amount of resins used

Columns were packed with cation and anion exchange resins that were mixed in a volume ratio of 1.66/1.0 to provide a bed height of 90 cm (total amount of the mixed resins was about 1.8 l each column); then, pure water containing iron oxides (hereinafter refer to as crud iron) suspended therein in trace amounts (ca. 17.5 ppb as Fe) was passed through the columns;

(iii) Linear velocity of feed water

LV=108 m/hr;

(iv) Feed time

At least three cycles, with one cycle being completed in ca. 16 days.

(v) Sampling of crud iron in influent and effluent

Crud iron suspended in stream of influent and effluent were daily collected onto the HA type Millipore Filters of which nominal pore size is 0.45 $\mu$m and of which diameter is 47 mm in order to measure and to determine the crud iron concentration.

(vi) Measurement and determination of crud iron concentration

Crud iron collected onto Millipore Filter was nondestructively measured and quantitatively determined by wavelength dispersive X-ray fluorescence spectroscopy. The instrument used in this study was Simultix System 3530 of Rigaku Denki Inc. equipped with micro-computer system for automatic data processing.

(2) Test Results

Figure 5:
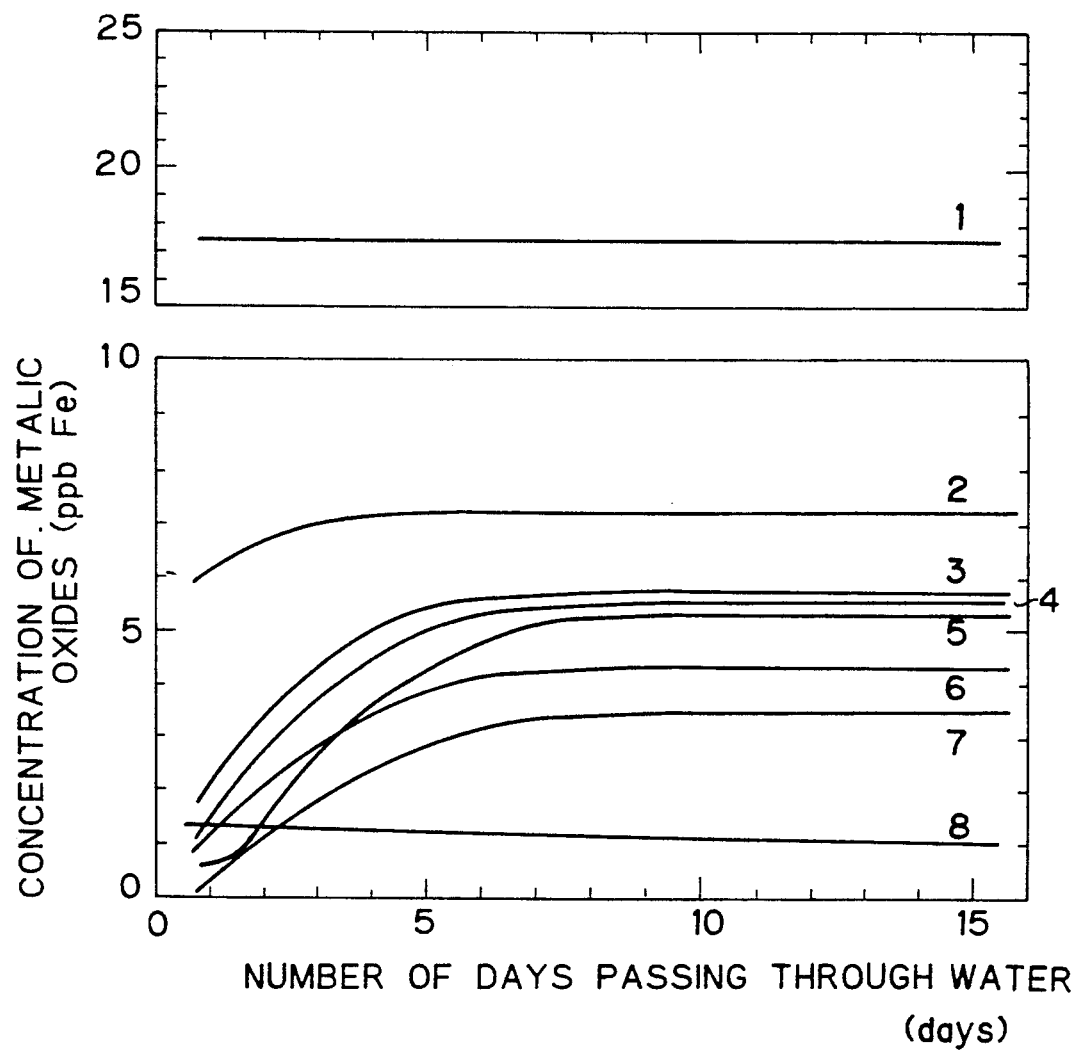
FIG. 5 is a graph showing several breakthrough curves obtained by removing metal oxides using various ion exchange resins in the "mixed bed" column test.

An example of the test results are shown in FIG. 5. The horizontal axis of the graph shown in FIG. 5 plots the number of days for which water was passed through the columns and the vertical axis plots the concentrations of iron oxides (in ppb as Fe) at the column inlet and outlet. The curves identified by 1-8 on the right side of the graph refer to the following: 1, the concentration of iron oxides in water at the column inlet; 2, the concentration of iron oxides in water at the outlet of the column packed with the conventional gel type i/n exchanger (XL=8%) (DIAION SK1B/SA10B); 3, the concentration of iron oxides in water at the outlet of the column packed with the polymeric adsorbent of the present invention (XL=10%); 4, the concentration of iron oxides in water at the outlet of the column packed with the conventional macroporous ion exchanger (XL=8%) (DIAION PK216/PA316), 5, the concentrati/n of iron oxides in water at the outlet of the column packet with the discarded conventional gel type ion exchanger (XL equivalent to 7%) (aged DIAION SK1B/SA10B); 6, the concentration of iron oxides in water at the outlet of the column packed with the conventional gel type ion exchanger (XL=6%) (DIAION SK106/SA10B); 7, the concentration of iron oxides in water at the outlet of the column packed with the polymeric adsorbent of the present invention (XL=8%); and 8, the concentration of iron oxides in water at the outlet of the column packed with the polymeric adsorbent of the present invention (XL=6%).

The results of the "mixed bed" column test demonstrate the following: given the same degree of crosslinking of cation exchange resins, the polymeric adsorbent of the present invention is more efficient in removing suspended iron oxides than either virgin or spend conventional gel type ion exchange resins, or conventional macroporous ion exchange resins; the efficiency of removal of iron oxides increases as the degree of crosslinking of strong acid cation exchange resins decreases; the polymeric adsorbent of the present invention that has a crosslinking degree (XL) of 6% exhibits particularly good performance. According to the results of the previous studies conducted by the present inventors, if the degree of crosslinking of cation exchange resins is too small, the crush strength of the resin matrices decreases and so does the total exchange capacity of the resins, whereby it becomes difficult to handle them in practical applications. The lower limit of the degree of crosslinking of cation exchange resin that is compatible with practical use is 3%.

FIG. 2 compares the polymeric adsorbent of the present invention with the conventional gel type ion exchange resin on the basis of the above-described test results, with the horizontal axis plotting the degree of crosslinking of the cation exchange resin or the polymeric adsorbent and the vertical axis plotting the concentration of metal oxides in the treated water.

Figure 6:
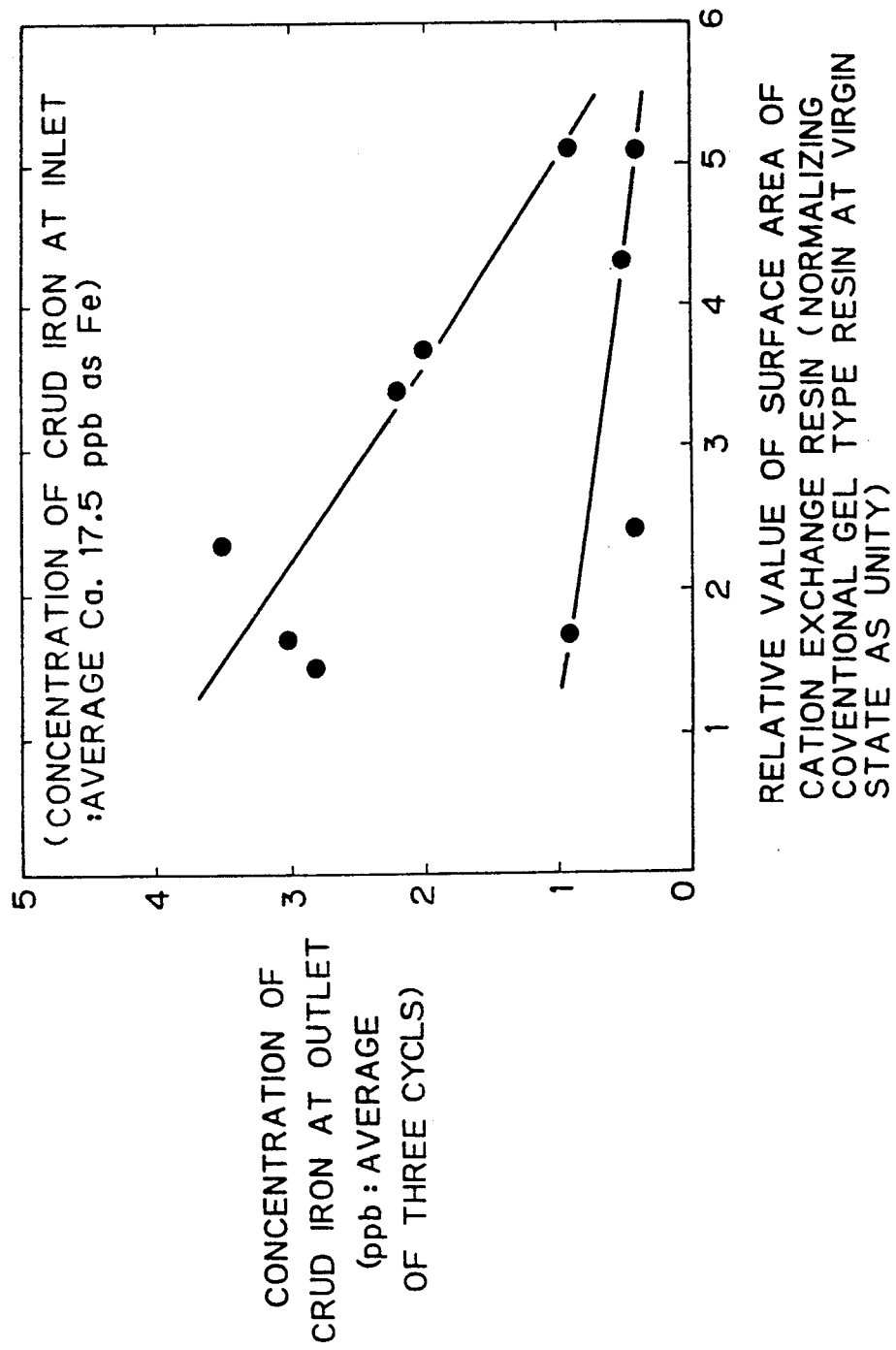
FIG. 6 is a graph showing the relationship between the specific surface area of a cation resin and the efficient removal of the crud iron.

In the next place, using the combination of the novel gel-type cation and anion exchange resins of the present invention, shown in Table 1, a test was conducted to evaluate their ability to remove crud iron. The test system had the construction shown in FIG. 4 and the test conditions were the same as those used in the mixed bed column test described in Example 1. The results of the test are shown in FIG. 6; the horizontal axis of the graph in FIG. 6 plots the relative value of the surface area of the cation exchange resin in the mixed bed, with the surface area of the conventional, gel type virgin cation exchange resin being normalized as unity, and the vertical axis plots the concentration of crud iron (ppb as Fe) at the column outlet. It is clear from FIG. 6 that as the surface area of the cation exchange resin increased, the concentration of crud iron at the column outlet had a tendency to converge at a lower value as accompanied by decreasing fluctuations, which demonstrates the efficient removal of the crud iron with the ion exchange resins. This phenomenon suggests that the specific surface area and other physical and/or chemical properties of cation exchange resins will play an important role in the removal of crud iron.

Figure 7:
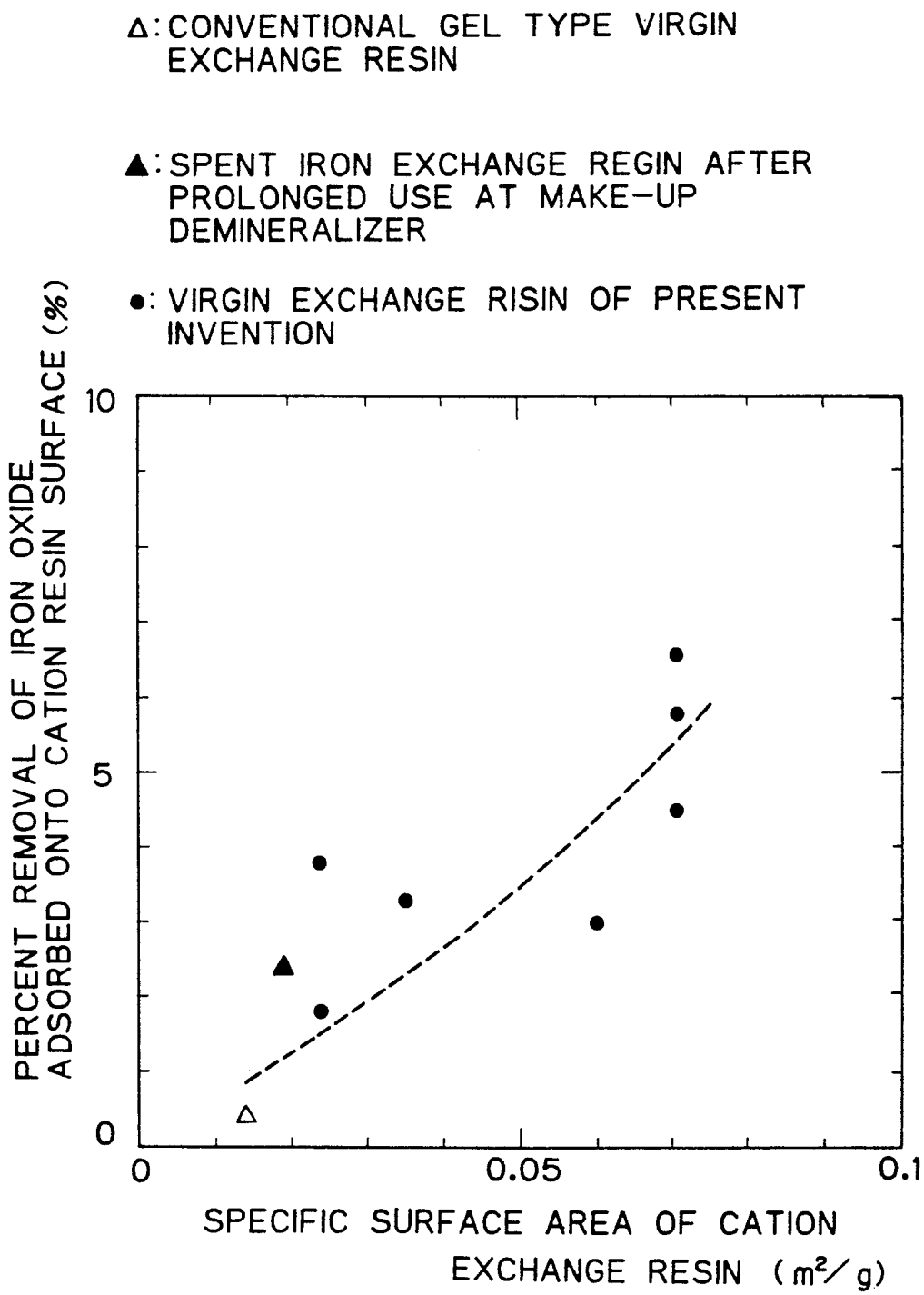
FIG. 7 is a graph showing the relationship between the specific surface area of a cation exchange resin and the percentage removal of crud iron adsorbed on the cation resin surface.

The results shown in FIG. 6 may be evaluated in terms of the percentage removal of "surface-adsorbed crud iron" which is specified as the crud iron adsorbed on the surface of the cation exchange resin beads as shown in FIG. 7. The horizontal axis of the graph in FIG. 7 plots the measured specific surface area of each cation exchange resin in the mixed bed, and the vertical axis plots the percentage of the iron content of the crud iron that was removed as "surface-adsorbed crud iron" with that cation exchange resin to the total iron content of the crud iron at the column inlet. The "surface-adsorbed crud iron" is the term conveniently used as a parameter for analyzing the performance of the cation exchange resin of the present invention and is defined as follows: after conducting the crud iron removal test under the aforementioned conditions of the mixed bed column test, the fine particles of crud iron that were trapped in the interstices between the beads of the ion exchange resins in the mixed bed were easily removed by back washing with water and air scrubbing (the thus removed crud iron may be referred to as "boundary-deposited crud iron"), and the crud iron that remained firmly adherence to the surface layer of the cation and-/or anion exchange resin was descaled by ultrasonic cleaning and collected on a filter paper; the thus obtained iron on the filter is defined as "surface-adsorbed crud iron".

FIG. 7 clearly shows that as the specific surface area of the cation exchange resin increased, its ability to remove the "surface-adsorbed crud iron" improved markedly. This phenomenon suggests that the key factor to improvement in the efficiency of removal of crud iron in a mixed bed polisher is to modify the environment in which the crud iron particles are incorporated into the bulk of the individual particles of the cation exchange resin via their surfaces.

It was thus demonstrated that the novel ion-exchange resin serving as the polymeric adsorbent of the present invention is very effective for the purpose of treating ultrapure water or condensate water to a very high purity level by removing trace amounts of colloidal metal oxides typified by crud iron.

EXAMPLE 2

Figure 8:
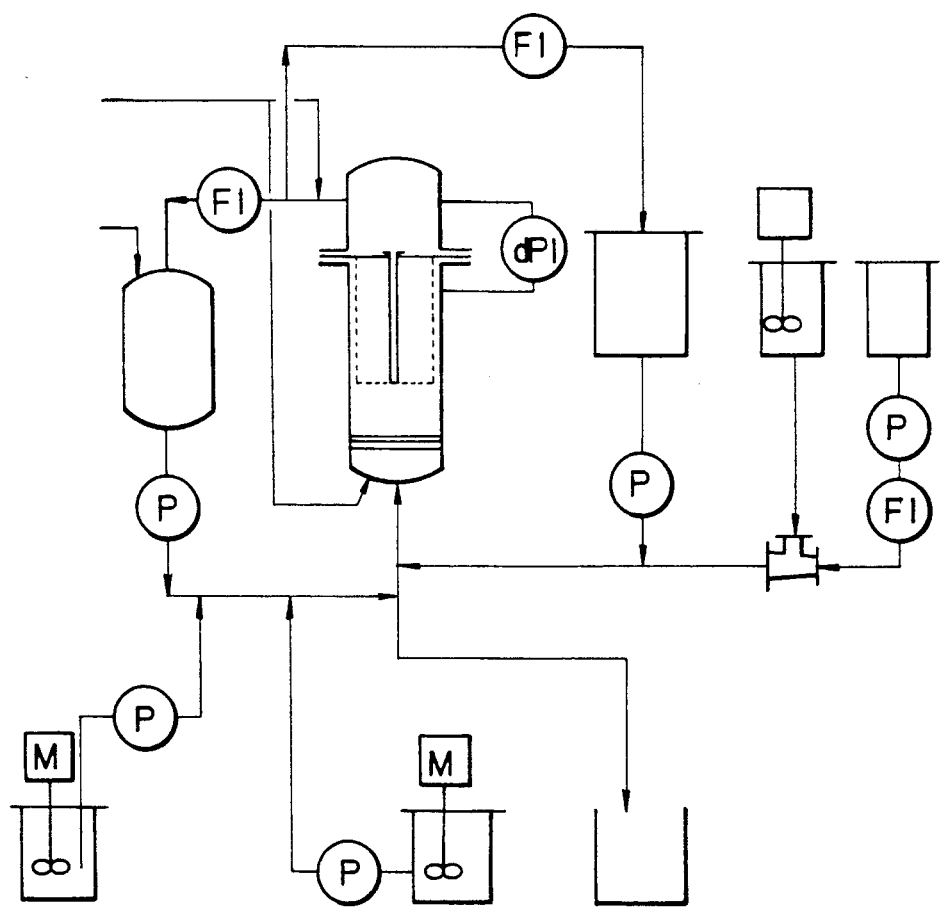
FIG. 8 is a flow diagram showing the filtration demineralization test system with precoated resin powder.

Filtration/Demineralization Test with Precoated Resin Powder (1) Test Conditions A test of removing crud iron was conducted using a filtration demineralization system (effective filtration area: 6 m$^2$) equipped with 53 stainless steel wire screen (mesh size, 32 μm) septa having a diameter of 25.4 mm (1 inch) and an effective length of 1,372 mm. The flow diagram of the test system is shown in FIG. 8.

The cation and anion exchanger resins shown in Table 1 were pulverized mechanically (e.g. by wet hammer milling) and the resulting resin powders were charged into a precoating material tank where they were mixed with water to form a water/resin slurry at a concentration of ca. 8%. The slurry was then fed through an eductor into the filter/demineralizer vessel to precoat it for 40 minutes at a precoat concentration of 0.04%.

(i) Resin mixing ratio

Cation/anion exchange resin=3/1 (on dry weight basis)

(ii) Precoating weight 1.0 kg of dry mixed resin/m$^2$ of filter area (total precoating weight=6.0 kg of dry mixed resin)

(iii) Precoating rate:

linear velocity (LV)=3.7 m/h (flow rate=22 m$^3$/h)

A circulating operation was performed at a LV of 7.8 m/h (flow rate=47 m$^3$/h) using a circulating pump, with an amorphous iron oxide being supplied continuously as a simulated crud iron from a crud feed tank by means of a metering pump. During the circulating operation, the concentration of the crud iron at the inlet of the filter/demineralizer was held at 200-300 ppb as Fe. The end point of the operation was controlled such that the differential pressure cross the filter/demineralizer was 1.75 kg/cm$^2$ (25 psi).

For comparison, a test was also conducted under the same conditions using a commercially available cation exchange resin powder (PD-3) and anion exchange resin powder (PD-1), both produced by Epicor, Inc.

(2) Test Results

The amount of crud iron that was trapped per unit filter area (FA) was 60–70 g as Fe/m$^2$ of FA for the resin powders of the present invention and 40–45 g as Fe/m$^2$ of FA for the commercially available resin powders. It was therefore clear that the resin powders of the present invention were more effective than the conventional versions in trapping crud iron.

TABLE 1

| | Analytical Results of New Gel Type Ion Exchange Resins | | | | | | | |
|---|---|---|---|---|---|---|---|---|
| Sample No. | Water retention capasity (wt %) | Wet bulk density (g-R/l) | Specific gravity (—) | Salt splitting capacity (meq/ml-R) | Crush strength (g/bead) | pH of surface of resin (—) | Specific surface area (m$^2$/g-dryR) | Zeta potential (mV) |
| (Cation) | | | | | | | | |
| C-1 | 62.3 | 730 | 1.16 | 1.55 | 640 | 1.64 | (NM) | (NM) |
| C-2 | 62.0 | 732 | 1.15 | 1.53 | 628 | 1.74 | 0.071 | −30.1 |
| C-3 | 62.4 | 730 | 1.17 | 1.58 | 683 | 1.78 | 0.048 | −29.8 |
| C-4 | 67.5 | 714 | 1.13 | 1.40 | 318 | 1.64 | 0.060 | −28.0 |
| C-5 | 62.7 | 719 | 1.15 | 1.55 | 630 | 1.63 | 0.071 | −30.6 |
| C-7 | 62.7 | 718 | 1.16 | 1.56 | 632 | 1.70 | 0.033 | −26.7 |
| C-8 | 64.3 | 714 | 1.14 | 1.44 | 346 | 1.51 | 0.053 | −30.1 |
| C-9 | 65.0 | 707 | 1.14 | 1.41 | 390 | 1.55 | 0.016 | −33.7 |
| C-10 | 63.3 | 719 | 1.15 | 1.51 | 523 | 1.57 | 0.052 | −31.3 |
| C-11 | 61.1 | 718 | 1.16 | 1.59 | 811 | 1.82 | 0.041 | −30.3 |
| C-12 | 61.2 | 713 | 1.16 | 1.62 | 983 | 1.85 | 0.036 | −32.8 |
| C-13 | 60.8 | 720 | 1.16 | 1.60 | 726 | 1.86 | 0.024 | −25.9 |
| C-14 | 59.8 | 726 | 1.16 | 1.65 | 1209 | 1.84 | 0.035 | −26.9 |
| (Anion) | | | | | | | | |
| A-1 | 54.0 | 659 | 1.08 | 1.05 | 634 | 13.7 | 0.030 | +23.7 |
| A-2 | 55.3 | 665 | 1.08 | 1.06 | 669 | 13.5 | 0.040 | +24.6 |
| A-3 | 57.0 | 663 | 1.08 | 0.96 | 570 | 12.6 | 0.038 | +23.9 |
| A-4 | 62.7 | 659 | 1.07 | 1.24 | 956 | 12.9 | 0.044 | +35.7 |
| A-5 | 60.7 | 657 | 1.07 | 1.30 | 1223 | 12.9 | 0.016 | +38.9 |
| A-6 | 61.6 | 655 | 1.08 | 1.45 | 525 | 11.6 | 0.045 | +40.5 |

(NM: not measured)

When the polymeric adsorbent of the present invention is used in a "mixed bed" filtering and demineralizing apparatus to remove suspended impurities present in trace amounts in pure water, metal oxides (particularly iron oxides) which are chief components of the impurities can be removed in sufficiently large amounts. In one application, the adsorbent may be used in treating condensate water produced in steam power generating facilities, in particular, primary cooling water used in boiling water nuclear power plants, and it is capable of highly efficient adsorption and removal of iron oxides present in trace amounts in the primary cooling water, thereby contributing to a reduction in the dose of radioactivity to which operators are exposed during periodical inspections at the outage. Another potential application of this adsorbent is in the production of ultrapure water to be used in the fabrication of semiconductors. The suspended impurities, chiefly composed of metal oxides, that are present in trace amounts in ultrapure water can be effectively adsorbed and removed by the adsorbent of the present invention, thus, making a great contribution to an improvement in the yield of semiconductor products.

What is claimed is:

1. A regeneratable (H form) cation exchange resin which is a particulate organic polymeric adsorbent for adsorbing and removing suspended impurities present in trace amounts in the water to be treated and which are chiefly composed of metal oxides, said resin:
    (a) having a dual structure with a skin layer being present to a depth of at least 0.1-10 $\mu$m from the surface,
    (b) comprising particles in a true spherical form having a diameter of 0.2-1.2 mm and an effective specific surface area of 0.02-0.20 m m$^2$ per gram of dry resin, with the effective specific surface area being measured on the basis of the amount of adsorption of krypton and/or a gas equivalent to krypton;
    (c) having such a surface layer structure that unit granules having a size of 0.1-1.0 $\mu$m are seen to bind with one another when examined under a scanning electron microscope in the field of view ranging from a magnification of 50 to 200.000, preferably from 1,000 to 10.000;
    (d) having a honeycomb and/or scaly surface structure with grooves in the surface, unit honeycombs and/or scales each having a unit surface area of 1-50 $\mu$m$^2$ and agglomerating together to form an irregular surface structure and morphology, with the surface being such that the individual unit honeycombs and/or scales are adjacent to one another via grooves having a width of 0.1-5.0 $\mu$m and a depth of 0.1-5.0 $\mu$m, said grooves having an overall length of 100-1,000 mm/mm$^2$;
    (e) having a crosslinking degree of from 3% to 8%;
    (f) having a surface pH (the concentration of hydrogen ions at the solid surface) of 1.50-1.90 in a wet state; and
    (g) having an interfacial electrokinetic potential (zeta potential) of $-20$ to $-40$ mV in a powder state in the range of about 50-100 $\mu$m (about 150-300 mesh) obtained by pulverizing said resin.

2. A regenerable (OH form) anion exchange resin which is a particulate organic polymeric adsorbent for adsorbing and removing suspended impurities present in trace amounts in the water to be treated and which are chiefly composed of metal oxides, said resin:
    (a) comprising particles in a true spherical form having a diameter 0.2-1,2 mm and an effective specific surface area of 0.02-0.10 M$^2$ per gram of dry resin, with the effective specific surface area being measured on the basis of the adsorption of krypton and/or a gas equivalent to krypton;
    (b) having a crosslinking degree of from 3% to 8%;
    (c) having a surface pH (the concentration of hydrogen ions at the solid surface) of 11.50-13.80 in a wet state; and
    (d) having an electrokinetic potential (zeta potential) of $+20$ to $+45$ mV in a powder state in the range of about 50-100 $\mu$m (about 150-300 mesh) obtained by pulverizing said resin.

3. A powdered H form cation exchange resin in the range of about 60-400 mesh produced by finely pulverizing the cation exchange resin recited in claim 2.

4. A powdered OH form anion exchange resin in the range of about 60-400 mesh produced by finely pulverizing the anion exchange resin recited in claim 2.

* * * * *